United States Patent [19]
Bauer et al.

[11] Patent Number: 5,086,446
[45] Date of Patent: Feb. 4, 1992

[54] X-RAY SHEET FILM CASSETTE

[75] Inventors: Walter Bauer, Munich; Ernst Widemann, Dachau; Manfred Schmidt, Kirchheim, all of Fed. Rep. of Germany

[73] Assignee: Agfa-Gevaert AG, Leverkusen, Fed. Rep. of Germany

[21] Appl. No.: 571,295

[22] Filed: Aug. 17, 1990

[30] Foreign Application Priority Data

Aug. 30, 1989 [DE] Fed. Rep. of Germany ....... 8910348

[51] Int. Cl.⁵ ............................................ G03B 42/04
[52] U.S. Cl. ................................. 378/188; 378/182; 378/185
[58] Field of Search ............................ 378/182–188, 378/208

[56] References Cited

U.S. PATENT DOCUMENTS

| | | | |
|---|---|---|---|
| 4,067,565 | 1/1978 | Daniels | 269/328 |
| 4,110,624 | 8/1978 | Conteas | 378/187 |
| 4,637,043 | 1/1987 | Bauer | 378/185 |
| 4,700,938 | 10/1987 | Chambron | 378/209 |

Primary Examiner—Janice A. Howell
Assistant Examiner—David P. Porta
Attorney, Agent, or Firm—Michael J. Striker

[57] ABSTRACT

The X-ray sheet film cassette has a top part hinged to a base part. The bottom of the base part is provided with a frame enclosing a film supporting plate through which the radiation is transmitted. The supporting plate has a laminated structure including two face plates of thermoplastically bonded carbon fibers and a comparatively thicker intermediate plate of a synthetic hard foam rubber sandwiched between the face plates and being glued thereto. The face plates are considerably thinner than the intermediate plate in the laminated supporting plate of the present invention.

4 Claims, 1 Drawing Sheet

X-RAY SHEET FILM CASSETTE

BACKGROUND OF THE INVENTION

The present invention relates to an X-ray sheet film cassette composed of a base part positionable adjacent a source of radiation and a top part hinged to the base part and lockable with the base part. The bottom of the base part is formed with a frame enclosing a plate for supporting a sheet film.

Cassettes of this kind are known, for example from German publications DE-GMS 8,014,696 or DE-GMS 8,520,091 or DE-PS 2,729,660. According to DE-GMS 8,014,696 the film supporting plate in the base part of the cassette is made of a plastic which is, reinforced by carbon fibers. In this manner the thickness of the plate can be reduced, because its strength is comparable with that of a metal. However a carbon fiber reinforced plastic has a greater radiation opacity than a pure plastic. Nevertheless due to the reduced thickness of a plate made of carbon fiber reinforced plastic a slight advantage is achieved. However, the production of carbon fiber reinforced plastic is expensive and costly.

SUMMARY OF THE INVENTION

It is therefore an object of the invention to provide a plastic cassette of the above described kink, wherein the film supporting plate in its base part is simpler and less costly to manufacture while having a comparable strength and radiation opacity as the prior art plates.

In keeping with this object and others which will become apparent hereinafter, one feature of the present invention resides in the provision of a laminated supporting plate in the base part of the cassette which is composed of an intermediate plate of hard foam rubber sandwiched and glued between two face plates of thermoplastically bonded carbon fibers. The face plates are considerably thinner than the intermediate plate in the laminated supporting plate of the present invention.

In the prior art X-ray sheet film cassettes, the thickness of the above described known film supporting plate is about 1.5 mm. The plastics component of the prior art plate is the main source of absorption of X-rays. In the laminated plate according to the invention, the thickness of the plastic component can be reduced by half in comparison with the prior art plates, inasmuch as only two comparatively thinner inner and outer face plates made of thermoplastically bonded carbon fibers which are simple to manufacture are glued to opposite sides of a somewhat thicker intermediate plate made of hard foam rubber, which is also easy to manufacture and exhibits only a negligible absorption of x-rays. In addition, the laminated structure is simpler and cheaper to manufacture than the conventional plates using carbon fiber reinforced plastics or laminated structures of plastic plates and carbon.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawings.

DESCRIPTION OF THE PREFERRED EMBODIMENT

Figure 1:
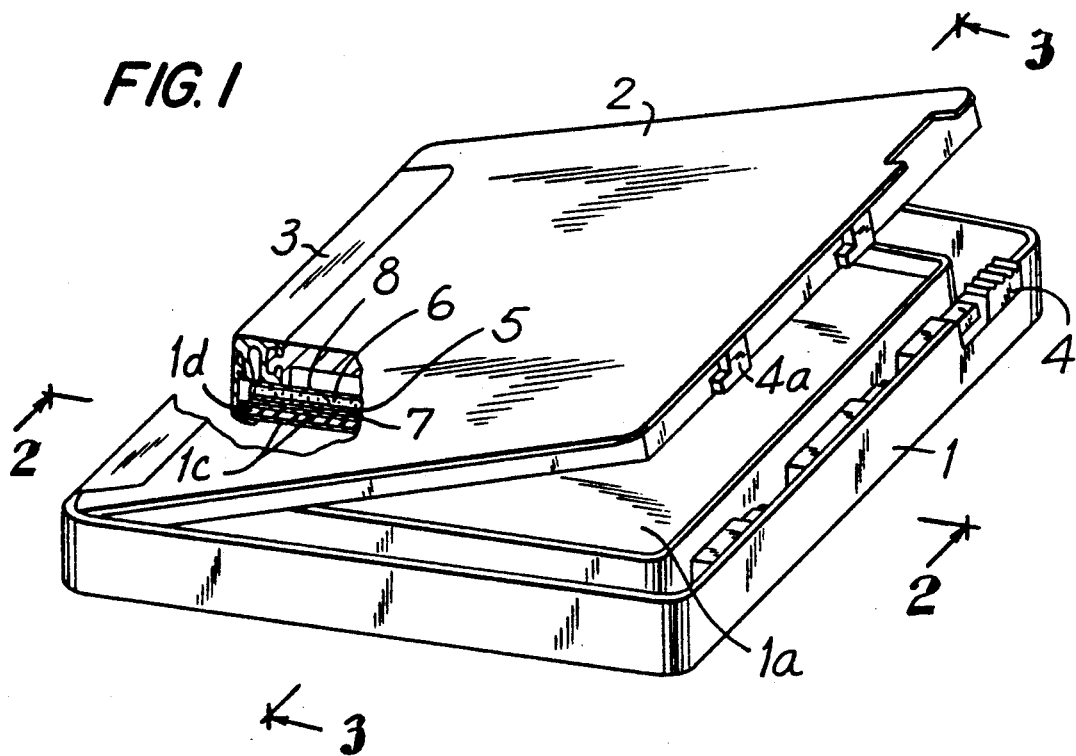
FIG. 1 is a perspective view of a cassette according to this invention shown with a cut-away portion.
Figure 2:
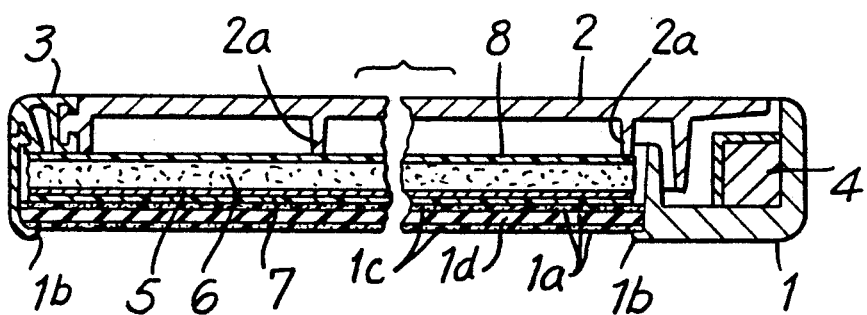
FIG. 2 is a sectional view of the cassette of FIG. 1 taken along the line II—II.
Figure 3:
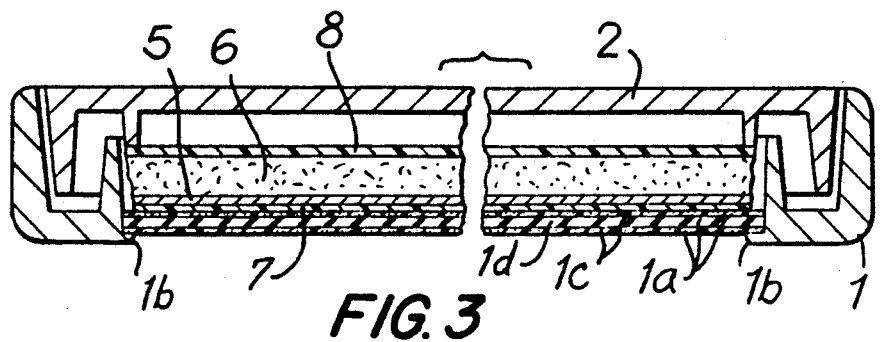
FIG. 3 is a sectional view taken along the line III—III of FIG. 1.

The X-ray sheet film cassette illustrated in the Figures includes a base part 1 which is linked by a hinge 3 to a top part 2. The top part 2 is provided with locking elements 4a engageable with a locking mechanism 4 on the base part. A top part 2 is formed with reinforcing ribs 2a to which a pressure plate 8 of thermoplastic material is welded. A cushion layer 6 is glued to the pressure plate 8 and a reinforcing foil 5 is secured to the free side of the cushion sheet 6. An X-ray sheet film 7 is supported on the base part 1.

A characteristic feature of the cassette of this invention is the provision of a frame 1b in the bottom of the base part in combination with a laminated supporting plate 1a which is attached to the frame by welding or glueing. In a modification it is also possible to insert the laminated plate into a frame which has been either inserted into the base part during its production in an injection mold or produced together with the base part in the mold by an injection molding process whereupon the plate is secured to the frame by a peripheral spraying. The important feature of the supporting plate 1a is its laminated construction consisting of two face plates 1c made of thermoplastically bonded carbon fibers and a somewhat thicker intermediate plate of hard foam rubber 1d, which is sandwiched and glued between the two carbon fiber face plates 1c. For example, the plate 1d of hard foam rubber can be about 2.5 mm thick, while the respective carbon fiber plates 1c have a thickness of about 0.3 mm. While the thickness of plastic material in conventional cassettes is about 1.5 mm, the combined thickness of the thin thermoplastically bonded carbon fiber plates 1c has been reduced to 0.6 mm.

The supporting plate 1a of this invention consisting of the above described glued layers is somewhat thicker than the conventional bottom plates or cassette bottoms made of carbon fiber reinforced plastics or laminated structures composed of carbon fiber material. In spite of this, the transmission coefficient of the laminated plate 1a of this invention for X-rays is greater than that of the prior art bottom plates, because of reduced thickness of components containing the plastic material and due to the negligible radiation absorption of the hard foam rubber. The requisite strength of the plate of the invention, in spite of the reduced thickness of the thermoplastically bonded carbon fiber plates 1c, is obtained by the particular laminated arrangement. The manufacturing cost for the laminated plate 1a of this invention is substantially lower than the cost of cassette base parts of carbon - fiber reinforced plastics or of carbon - fiber plates laminated with plastic plates because both the thermoplastically bonded carbon - fiber sheets and hard foam rubber sheets are mass produced and are commercially available at a low price.

What is claimed as new and desired to be protected by Letters Patent is set forth in the appended claims:

1. In an X-ray film sheet cassette including a base part having a bottom provided with a frame and a supporting plate connected to and held by the frame, a top part hinged to the base part for closing the same, and a film within the cassette being exposable to radiation transmitted through the supporting plate, the improvement wherein the supporting plate includes two face plates (1c) of thermoplastically bonded carbon fibers and a comparatively thicker intermediate plate (1d) of hard foam rubber sandwiched between and glued to the two face plates (1c).

2. The improvement as defined in claim 1, wherein the supporting plate is secured to the frame by one of welding and glueing.

3. The improvement as defined in claim 1, wherein the supporting plate is attached to the frame by injection molding.

4. In an X-ray film sheet cassette including a base part having a bottom provided with a frame and a supporting plate connected to and held by the frame, a top part hinged to the base part for closing the same, and a film within the cassette being exposable to radiation transmitted through the supporting plate, the improvement wherein the supporting plate includes two face plates (1c) of thermoplastically bonded carbon fibers and a comparatively thicker intermediate plate (1d) of hard foam rubber sandwiched between and glued to the two face plates (1c), wherein the face plates (1c) each have a thickness of about 0.3 mm and the intermediate plate has a thickness of about 2.5 mm.

* * * * *